(12) United States Patent
Serri et al.

(10) Patent No.: US 12,179,816 B2
(45) Date of Patent: Dec. 31, 2024

(54) RECOGNITION SYSTEM FOR DETERMINING A POSITION OF A BRAKING CONTROL DEVICE

(71) Applicant: FAIVELEY TRANSPORT ITALIA S.P.A., Piossasco (IT)

(72) Inventors: Stefano Serri, Nichelino (IT); Giovanni Sica, Turin (IT); Roberto Tione, Lauriano (IT)

(73) Assignee: Faiveley Transport Italia S.P.A., Piossasco (IT)

(*) Notice: Subject to any disclaimer, the term of this patent is extended or adjusted under 35 U.S.C. 154(b) by 928 days.

(21) Appl. No.: 17/204,628

(22) Filed: Mar. 17, 2021

(65) Prior Publication Data

US 2021/0197876 A1    Jul. 1, 2021

Related U.S. Application Data

(63) Continuation-in-part of application No. PCT/IB2019/057841, filed on Sep. 18, 2019.

(51) Int. Cl.
| | |
|---|---|
| *B61L 25/02* | (2006.01) |
| *B60T 8/17* | (2006.01) |
| *B60T 8/18* | (2006.01) |
| *B60T 17/22* | (2006.01) |
| *G06K 7/14* | (2006.01) |

(52) U.S. Cl.
CPC .......... *B61L 25/028* (2013.01); *B60T 8/1705* (2013.01); *B60T 8/1893* (2013.01); *B60T 17/228* (2013.01); *G06K 7/1413* (2013.01); *G06K 7/1417* (2013.01)

(58) Field of Classification Search
None
See application file for complete search history.

(56) References Cited

U.S. PATENT DOCUMENTS

| | | | |
|---|---|---|---|
| 5,651,517 A | 7/1997 | Stevens et al. | |
| 6,012,681 A | 1/2000 | Lumbis et al. | |
| 7,357,463 B2 | 4/2008 | Barberis et al. | |
| 9,919,723 B2 * | 3/2018 | Bhagwatkar | B61L 27/53 |

(Continued)

FOREIGN PATENT DOCUMENTS

| | | | | |
|---|---|---|---|---|
| CA | 2996257 C | * | 6/2018 | ............ B61L 25/021 |
| CN | 102381298 B | * | 4/2013 | ............... B60Q 1/44 |
| CN | 208306642 U | * | 1/2019 | ............... B61B 3/00 |

OTHER PUBLICATIONS

International Search Report for corresponding application No. PCT/IB2018/057841 mailed Jan. 21, 2020 (4 pages).

(Continued)

*Primary Examiner* — Melanie Torres Williams
(74) *Attorney, Agent, or Firm* — K&L Gates LLP

(57) ABSTRACT

A recognition system of a position of a mechatronic braking control device associated with a railway vehicle along a train is described. The recognition system includes a sustaining and fixing support installed on the railway vehicle, an identifying binary coding of the position along the train, and a mechatronic braking control device adapted to be fixed to the sustaining and fixing support and including an optical reading device arranged to detect the identifying binary coding. The mechatronic braking control device determines the position along the train according to the binary coding that is read by the optical reading device.

20 Claims, 2 Drawing Sheets

(56) References Cited

U.S. PATENT DOCUMENTS

| | | |
|---|---|---|
| 9,994,201 B2 | 6/2018 | Correndo et al. |
| 10,464,543 B2 | 11/2019 | Tione et al. |
| 2013/0186193 A1 | 7/2013 | Sich |
| 2020/0031330 A1 | 1/2020 | Tione |

OTHER PUBLICATIONS

Written Opinion of the International Searching Authority for corresponding application No. PCT/IB2018/057841 mailed Jan. 21, 2020.

EN50126, "Railway applications. The specification and demonstration of reliability, availability, maintainability and safety (RAMS)" 2017, Part 1 (109 pages).

EN50126, "Railway applications. The specification and demonstration of reliability, availability, maintainability and safety (RAMS)" 2017, Part 2 (83 pages).

EN50128, "Railway applications. Communications, signaling and processing systems. Software for railway control and protection systems" Mar. 11, 2001 (10 pages).

EN50129, "Railway applications. Communication, signaling and processing systems. Safety related electronic systems for signaling" Feb. 2003 (94 pages).

\* cited by examiner (KNOWN TECHNIQUE)

RECOGNITION SYSTEM FOR DETERMINING A POSITION OF A BRAKING CONTROL DEVICE

CROSS-REFERENCE TO RELATED APPLICATIONS

This application is a bypass continuation-in-part of International Patent Application No. PCT/IB2019/057841 (filed 18 Sep. 2019), which claims priority to Italian Patent Application No. 102018000008688 (filed 18 Sep. 2018). The entire disclosures of these applications are incorporated herein by reference.

BACKGROUND

Technical Field

The present invention is, in general, in the field of railway braking systems; in particular, the invention refers to a recognition system that determines a position of a mechatronic braking control device associated with a vehicle (e.g., a railway vehicle) along a multi-vehicle system (e.g., a train).

Discussion of Art

In the railway world, mechatronic devices integrating mechanical, pneumatic, and electronic portions based on microprocessors, and thus equipped with software, are commonly used. Where these mechatronic devices are used for braking, the mechatronic devices are present in quantities at least equal to the number of railway vehicles making up the train, i.e., one device per railway vehicle, up to a maximum of two devices per railway vehicle.

Normally, the software code is the same for all mechatronic devices installed on the same train, unless there are parameters of which the value is specific to the position of the device itself along the train.

The definition "position of the device itself along the train" in the present document means the position of the railway vehicle, whereon the device is installed, relative to the whole train. For example, when considering a train composed of ten railway vehicles, determining the position (of the device) will consist in assessing on which vehicle the device is placed relative to other railway vehicles, for example, according to the direction of travel. The device may be positioned, for example, on the first, second, third, etc., railway vehicle of the train according to the direction of travel. Additionally, several devices may be present on a vehicle of the same train, for example one device per bogie, and therefore the definition of the position of the device will depend on which bogie and which vehicle correspond to the linear location of the device itself along the train.

Non-exclusive examples of parameters of the software code may be:
- the tare and full load value of the railway vehicle of the train whereon the device is installed (which is used as the basis for calculating the braking force to achieve a required deceleration);
- the parameters of the blending curves, i.e., the blending of the pneumatic braking force and the electrodynamic regenerative braking force;
- the parameters relating to the configuration of the communication protocols; and
- the parameters relating to the operation of an anti-lock system.

Additionally, a mechatronic braking control device may be installed on different trains, using the same software code but in a different configuration. For example, the same train may consist of different numbers of railway vehicles at different times, in which case the same software will have to be configured differently. Stated differently, a train may have first, second, and third railway vehicles, with the braking control devices configured to control braking of the three-vehicle train. The third railway vehicle may be removed from the train at a later time, and fourth and fifth vehicles may be added to the train to form a four-vehicle train. The braking control devices onboard the first and second vehicles may need to be re-configured or re-programmed to ensure that the brakes of those vehicles are correctly controlled to brake the now four-vehicle train. But, the programming and re-programming of the brake control devices can be time-consuming and laborious.

Some of the software configuration parameters are used by software modules of the brake control devices, the functionality of which may be classified according to $SIL \geq 1$ safety levels according to European standards EN50126, EN50128, EN50129 or other standards. In this case, the process of recognizing the position of the braking control device along the train must be adapted to the same level of safety. In other words, the coding used for recognition of the location of the braking control device along the train must be provided with a number of additional symbols to ensure that a possible coding or reading error is recognized with a probability relative to the identified SIL level.

State-of-the-art solutions already exist that allow the braking device to identify the position thereof along the train.

FIG. 1 illustrates one of these known solutions. In particular, a connector 101, for example, female, is fixed to a fixing support 102 of a mechatronic braking control device 104. The support normally is attached to the vehicle body, and a corresponding male connector 103 is fixed to a mechatronic device 104 at the position of the female connector 101.

In this example, the mechatronic device 104 is based on a microprocessor system 106. The male connector 103 is electrically connected to a digital input port 105 of the microprocessor system 106, where all the pins 107 of the male connector except one are connected to pull-up resistors 108 bound to a power supply of the microprocessor system and a pin 109 of the male connector is connected to the ground of the microprocessor system.

The female connector 101, permanently mounted to the fixing support 102 on the train, codes the position information in binary mode, where the pins indicating "logical zero" are connected to the pin of the female connector corresponding to the pin of the grounded male connector, where the pins indicating "logical one" are left disconnected, allowing the pull-ups connected to the male connector to generate the "logical one" level. The arrangement, pattern, or sequence of pins indicating "logical zero" versus the pins indicating "logical one" can be different for different connectors connected to different braking control devices to encode or represent the location of the vehicle in the train and/or other parameters for controlling braking using the brake control device.

On the basis of what has been described, FIG. 1 shows, by way of example, a binary coding, from top to bottom, equal to 1001110, or 142 in decimal.

This method, although widespread, has several drawbacks. A first drawback is the possible oxidation of the contacts in the long term, leading to false readings over time.

A second drawback is the fragility of the male connector the pins of which may be damaged during the installation of the mechatronic device. Thus, one of the two connectors must be partially floating with respect to the nominal position thereof, in order to absorb the fitting tolerances during installation. A third drawback is the low pin count of the connectors that must be used in this type of application. This makes it virtually impossible to add an additional number of error detection bits suitable for a safety level SIL 4 corresponding to a probability $10^{-9}$ of unrecognized error. As a result, the use of pin arrangements to notify braking control devices of the locations of the braking control devices in trains is prone to error.

BRIEF SUMMARY

One object of the present invention is to provide a solution that reduces false readings, even over time and wear, which reduces possible damage during the installation of the recognition system, and allows for the addition of bits (redundant or otherwise) for error detection so that one may achieve an adequate SIL 4 safety level.

In short, the proposed system may be able to recognize the train on which a braking control device is installed and/or the fleet to which the braking control device belongs. Such a system may be used for a mechatronic braking system to self-configure a parametric software with which the braking control device is equipped.

The proposed system is in other words a contactless system based on software codes.

The aforesaid and other objects and advantages are achieved, according to one aspect of the invention, by a recognition system that determines the position of a mechatronic braking control device associated with a railway vehicle along a train.

BRIEF DESCRIPTION OF THE DRAWINGS

The functional and structural features of some of the embodiments of a recognition system that determines the position of a mechatronic braking control device associated with a railway vehicle along a train according to the invention will now be described. Reference is made to the accompanying drawings, wherein.

DETAILED DESCRIPTION

Figure 1:
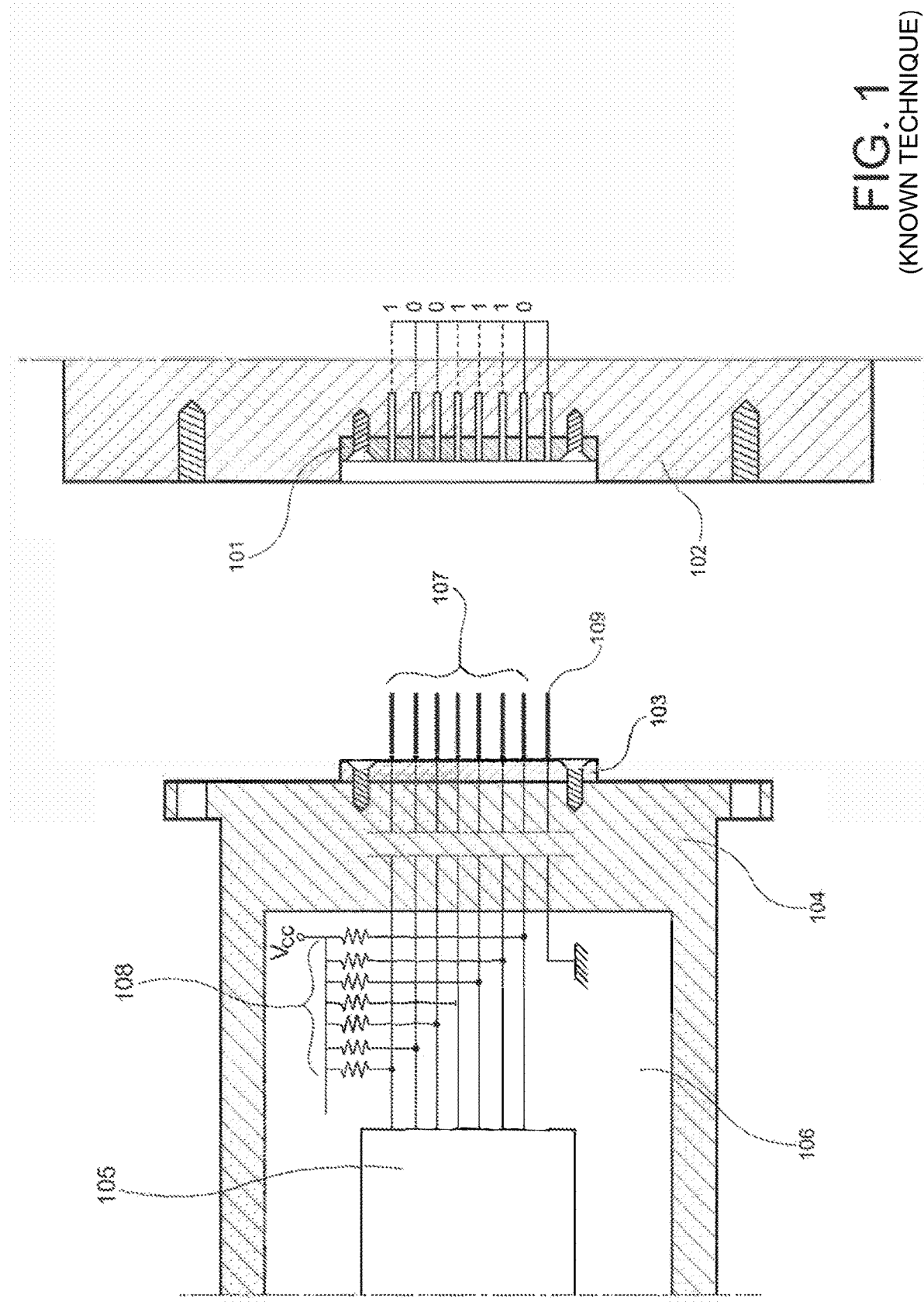
FIG. 1 illustrates a solution according to the prior art.

Before explaining a plurality of embodiments of the invention in detail, it should be clarified that the invention is not limited in its application to the details of construction and to the configuration of the components presented in the following description or illustrated in the drawings. The invention may assume other embodiments and may in practice be implemented or achieved in different ways. It should also be understood that the phraseology and terminology have descriptive purposes and should not be construed as restrictive. The use of "include" and "comprise" and the variations thereof are to be understood as encompassing the elements stated hereinafter and the equivalents thereof, as well as additional elements and the equivalents thereof.

In one embodiment, the recognition system comprises a sustaining and fixing support 200 installed on a railway vehicle. This sustaining and fixing support 200 is illustrated by way of example in FIG. 2A. In one embodiment, the support 200 can represent a wall or other surface in the vehicle.

The recognition system further comprises an identifying binary coding 203 of the position of the braking control device along the train, which is reported in the sustaining and fixing support. The expression "reported in the support" means that the coding may be obtained directly in the sustaining and fixing support or may be obtained on another element 201 that will then be bound to this sustaining and fixing support, for example by fixing means 202. The element 201 can represent a plate, sticker, or other body having a surface on which the coding 203 is provided. The fixing means 202 can include one or more fasteners, such as one or more screws, nails, bolts, adhesives, etc.

Figures 2A, 2B:
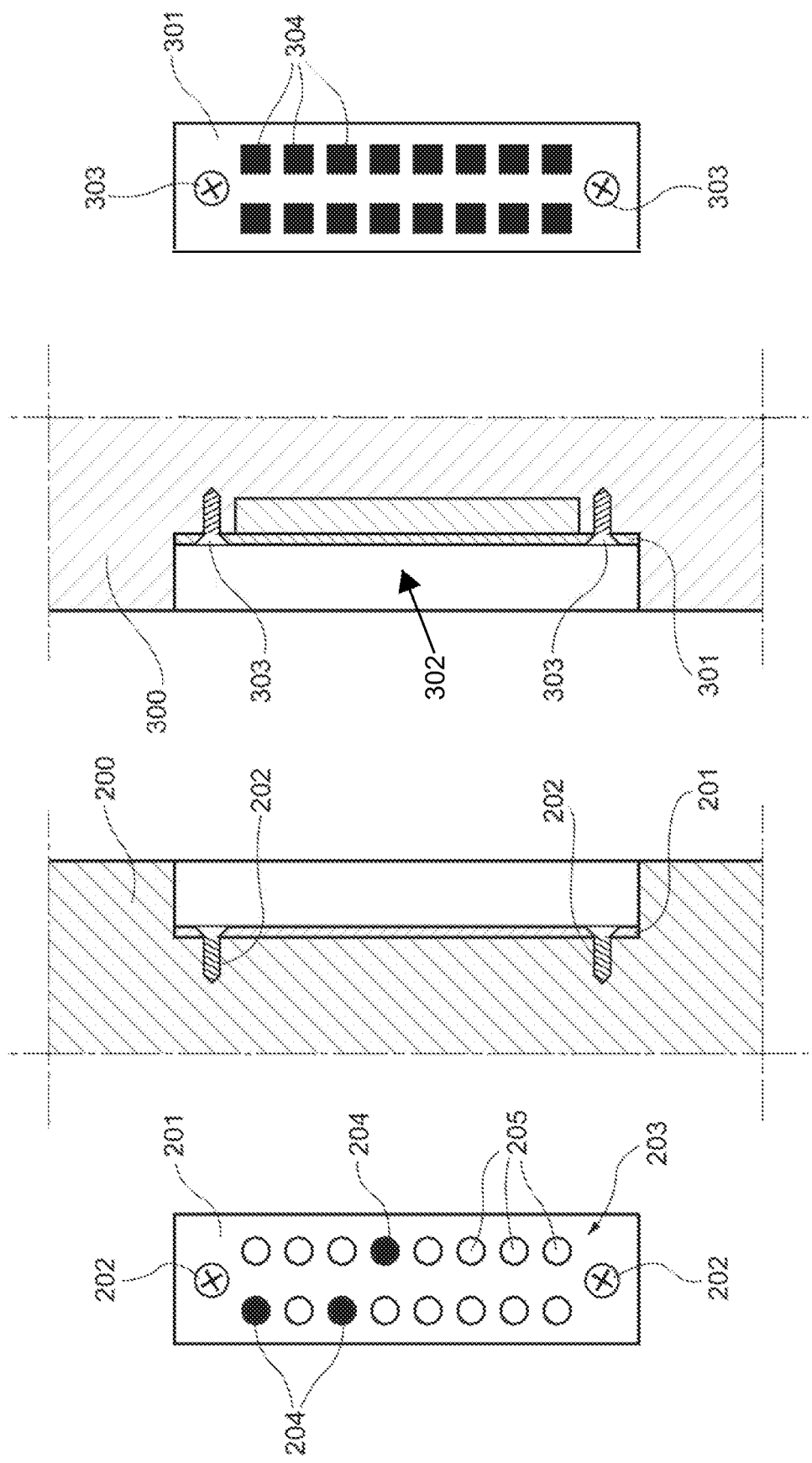
FIG. 2A illustrates, by way of example, front and side views of a sustaining and fixing support of a recognition system that determines the position of a mechatronic braking control device associated with a railway vehicle along a train and an example of binary coding.
FIG. 2B illustrates, by way of example, a front view and a side view of a mechatronic braking control device.

Looking now at FIG. 2B, the recognition system further comprises a mechatronic braking control device 300 adapted to be fixed to the sustaining and fixing support 200. The mechatronic braking control device 300 comprises an optical reading device 301 arranged to detect the identifying binary coding 203 shown on the element 201. The optical reading device 301 may, for example, be attached to the mechatronic braking control device 300 by fixing means 303. The fixing means 303 can include one or more fasteners, such as one or more screws, nails, bolts, adhesives, etc.

The mechatronic braking control device 300 will determine the position of the device 300 along the train according to the identifying binary coding 203 which is read by the optical reading device 301. In other words, the detection of the identifying binary coding 203 by the mechatronic braking control device 300 may be based on a contactless coding system, in particular based on an optical scanning system.

The coding may comprise an optical code provided on the sustaining and fixing support 200 attached to a rail vehicle. In a non-exclusive example, such an optical code may be composed of "logical zeros" and "logical ones", which may be obtained, for example, by means of reflective symbols 204 representing the "logical zero" and non-reflective opaque symbols 205 representing the "logical one", as shown in FIG. 2A. The optical code may also have the form of a vector or matrix. Optionally, the symbols 204, 205 may be different colors (e.g., black and white), may have different surfaces (e.g., different diffraction gratings), or otherwise appear differently from each other.

The opaque and reflective symbols may be obtained, by way of example, by machining directly onto the fixing support or, by way of example, by a printed plate 201 suitably fixed to the fixing support, or again by way of example, by a printed and perforated plate, with the holes representing, for example, but not exclusively "logical ones." The latter case is the one illustrated in FIG. 2A, where a solution based on an 8×2 matrix is shown.

The mechatronic braking control device may include a microprocessor circuit that includes one or more microprocessors that control operation of the braking control device. The braking control device can control application of a brake of a vehicle. For example, based on the parameters described herein and, in response to receiving an electric signal (e.g., from another system, based on operator input, etc.), can engage or release the brake. For example, the braking control device may control one or more valves to vent air out of a reservoir to engage an air brake, may control the valve(s) to direct air into the reservoir (e.g., from a compressor) to release the air brake, may control a traction motor (by generating electric signals) to dynamically brake (via regenerative braking), may control the traction motor to stop dynamic braking, etc. The braking control device can determine how and/or when to engage or release the brake based on the parameters and/or the location of the braking control device in the train.

The optical reading device 301 may be electrically connected to a logic input port of the microprocessor circuit of the braking control device. Moreover, as may be seen in FIG. 2B, the optical reading device may be fixed in a slot 302 of the mechatronic device in such a way as to be able to read the identifying binary coding shown on the sustaining and fixing support 200. For example, the optical reading device 301 may face the binary coding 203 on the support 200 once the braking control device 300 is mounted on the vehicle. Prior to installation, the braking control device 300 and the microprocessor circuit of the device 300 may not be programmed or otherwise configured with the location of the vehicle in the train where the braking control device 300 is being installed. Optionally, the braking control device 300 and the microprocessor circuit of the device 300 may not be programmed or otherwise configured with one or more of the software parameters needed by the braking control device 300 and the microprocessor circuit for determining how to control the brake.

The optical reading device 301 includes several illuminating and onto-sensitive devices 304. These devices 304 can include light sources (e.g., light emitting diodes, fluorescent lights, iridescent lights, etc.) that generate light toward the element 201 having the coding 203. The devices 304 also can include optical sensors or electro-optical sensors that detect light (or changes in light) and generate signals based on this detection. From the slot 302, a vector or a matrix of the illuminating and opto-sensitive devices 304, in a number corresponding to the number of bits coded by the vector or by the matrix of the symbols 204, 205 on the fixing support 201, may illuminate and read the codes reported.

For example, the optical reading device 301 can have several optical sensor devices 304 in an arrangement with each optical reading device 301 facing or opposing a different one of the symbols 204 or 205. Each optical sensor device 304 can generate light toward the corresponding symbol 204 or 205. The light directed toward the reflective symbols 204 may be reflected back toward the optical sensor device 304 that generated the light, or may be reflected back to a greater extent (more light is reflected back) when compared to the non-reflective opaque symbols 205. Each optical sensor device 304 can detect the reflected light (for the symbols 204) or the absence of reflected light (for the symbols 205). The devices 304 can output an electric signal indicating receipt of reflected light (for the symbols 204) and may not output an electric signal when the reflected light is not received or is received to a lesser extent (for the symbols 205). Alternatively, the optical sensor devices 304 can output an electric signal indicating receipt of reflected light and output a different electric signal when the reflected light is not received or is received to a lesser extent. Alternatively, the devices 304 may not output an electric signal indicating receipt of reflected light and may output an electric signal when the reflected light is not received or is received to a lesser extent.

The microprocessor circuit of the braking control device can receive these signals and determine the binary coding 203 represented by the arrangement of the symbols 204, 205. Different elements 201 with different arrangements of the symbols 204, 205 can be provided onboard different vehicles (and/or different bogies or wheels of the same vehicle) so that the binary coding 203 differs for the different vehicles, different bogies, and/or different wheels. The different arrangements of the symbols 204, 205 represent the location of the elements 201 (and, therefore, the braking control devices) along the length of the train. The microprocessor(s) can determine the location and/or parameters used for braking from the arrangement of the symbols 204, 205 in the binary coding 203 that is detected by the opto-sensitive illuminating devices 304.

To avoid optical interference, vector or matrix management software that directs operation of the microprocessor circuit's control of the opto-sensitive illuminating devices may activate one opto-sensitive illuminating device at a time. To avoid premature aging of the opto-sensitive illuminating devices, the scan may be performed, for example, but not exclusively, only during the power-on state of the train or braking control device 300, and possibly be repeated with a very long period.

Identifying binary coding may advantageously include at least one additional symbol provided to allow the detection of a read error. The number of additional symbols for error detection and the coding process may allow error recognition during the reading process according to the SIL≥1 safety level described by the standards EN50126, EN50128, EN50129 and/or other safety standards. For example, the binary coding 203 may represent the location and parameters (as described herein), and at least one additional symbol 204 or 205 that is not used to represent the location or parameters may be used for detection of a read error.

The recognition system may be used to identify the location of the mechatronic device in a set of multiple mechatronic devices located in a finite installation context. In other words, the mechatronic devices of the recognition system may be more than one and be installed on the same train. The identifying binary coding may also be provided to indicate a type of train and/or the fleet to which that train belongs, in addition to or as an alternative to indicating the position of the device along the train. The recognition system may thus also be used to identify the type of train and/or the fleet to which said train belongs. The support 201 and the binary coding 203 on the support 201 may remain fixed in position onboard the same vehicle such that, when the braking control device is installed or replaced with another braking control device, the installed or replacement braking control device can automatically optically read the binary coding 203 to obtain the location and braking parameters, without having to separately program this information into the braking control device.

The knowledge of the coding and position may be used by the mechatronic braking control device to self-configure software parameters necessary for the correct operation of the mechatronic braking control device. For example, the parameters may be, by way of example, inter alia, those already described previously:

the tare and full load value of the railway vehicle of the train on which the device is installed;
parameters of the blending curves;
the parameters relating to the communication protocols; and
the parameters relating to the operation of the anti-lock system.

The advantages of the present solution are as follows:

there are no exposed mechanical parts that could be damaged during the installation thereof;

there are no contacts that could oxidize and cause inaccurate readings; and a much higher number of symbols may be achieved than with conventional connectors for this type of use.

Various aspects and embodiments of a recognition system of the position along a train of a mechatronic braking control device associated with a railway vehicle according to the invention have been described. It is understood that each embodiment may be combined with any other embodiment. The invention, moreover, is not limited to the described embodiments, but may be varied within the scope defined by the accompanying claims. For example, the braking control device may include a camera or other optical sensor that detects the binary coding 203. As another example, the information represented by the binary coding 203 may be represented or provided on the support 201 in another manner, such as a bar code, a quick release (QR) code, text and/or numerical strings (that the microprocessor(s) of the braking control device can interpret using optical character recognition), or the like.

What is claimed is:

1. A recognition system comprising:
   an identifying information coupled with a support onboard a railway vehicle in a train, wherein the identifying information is representative of a position of the railway vehicle along the train; and
   a braking control device comprising an optical reading device that is configured to detect the identifying information;
   wherein a position of the braking control device along the train can be determined according to the identifying information read by the optical reading device.

2. The recognition system according to claim 1, wherein the identifying information is composed of symbols in a vector or matrix.

3. The recognition system according to claim 1, wherein the braking control device includes a microprocessor circuit and the optical reading device is electrically connected to a logic input port of microprocessor circuit.

4. The recognition system according to claim 1, wherein the optical reading device is configured to be fixed in the braking control device to read the identifying information.

5. The recognition system according to claim 1, wherein the identifying information includes at least one read error symbol.

6. The recognition system according to claim 5, wherein the at least one read error symbol is configured to provide error recognition according to a designated safety level.

7. The recognition system according to claim 1, wherein the braking control device is configured to identify the position of the braking control device from among several additional braking control devices located onboard the train.

8. The recognition system according to claim 1, wherein the identifying information is further arranged to indicate one or more of a type of the train or a fleet to which the train belongs.

9. The recognition system according to claim 1, wherein the braking control device is configured to self-configure software parameters for operation of the braking control device based on the identifying information.

10. A system comprising:
    an arrangement of different symbols disposed on a surface of a vehicle in a multi-vehicle system, wherein the arrangement of different symbols represents encoded information of one or more characteristics of the vehicle; and
    one or more optical sensors configured to detect reflection of light off the symbols in the arrangement and communicate the reflection that is detected to a braking control device for operation of the braking control device based at least in part on the one or more characteristics of the vehicle as determined from the detected reflection.

11. The system of claim 10, wherein the different symbols in the arrangement include one or more first symbols that reflect light and one or more second symbols that reflect less light than the one or more first symbols.

12. The system of claim 10, wherein the one or more characteristics of the vehicle include a location of the vehicle in the multi-vehicle system, and the different symbols in the arrangement are positioned to represent a binary coding of the location of the vehicle in the multi-vehicle system.

13. The system of claim 12, wherein the different symbols in the arrangement represent one or more other characteristics of the vehicle in addition to the location of the vehicle that are used to control braking by the braking control device.

14. The system of claim 13, wherein the one or more other characteristics of the vehicle represented by the different symbols in the arrangement include one or more of a tare and full load value of the vehicle, a blending curve, a communication protocol configuration, or operation of an anti-lock system.

15. The system of claim 10, wherein the one or more optical sensors include one optical sensor for each of the symbols.

16. The system of claim 10, wherein the arrangement of the different symbols is a first arrangement of plural, different arrangements of the different symbols onboard different vehicles of the multi-vehicle system.

17. A system comprising:
    a braking control device configured to be disposed onboard a first railway vehicle of a train having the first railway vehicle and one or more additional railway vehicles, the braking control device configured to control braking of the first railway vehicle based on a location of the braking control device along a length of the train; and
    one or more optical sensors configured to be coupled with the braking control device and to optically detect a coding disposed on a surface in the first railway vehicle, the braking control device configured to determine the location of the braking control device based on the coding that is detected and to control braking of the first railway vehicle based on the location that is determined.

18. The system of claim 17, wherein the one or more optical sensors are configured to detect the coding as a binary coding formed in a pattern of different symbols disposed on the surface in the first railway vehicle.

19. The system of claim 17, wherein the braking control device is configured to determine the location and one or more braking parameters used to control the braking of the first railway vehicle based on the coding that is detected by the one or more optical sensors.

20. The system of claim 17, wherein the coding includes plural different symbols disposed on the surface of the first railway vehicle, and the one or more optical sensors include one optical sensor for each of the symbols disposed on the surface of the first railway vehicle.

\* \* \* \* \*